United States Patent [19]

Ream et al.

[11] 4,151,270

[45] Apr. 24, 1979

[54] CHEWING GUM COMPOSITION

[75] Inventors: Ronald L. Ream, North Aurora; David M. Moore, Lombard, both of Ill.

[73] Assignee: Wm. Wrigley Jr. Company, Chicago, Ill.

[21] Appl. No.: 836,383

[22] Filed: Sep. 26, 1977

[51] Int. Cl.² .............................................. A61K 9/68
[52] U.S. Cl. ......................................... 424/48; 426/3; 426/4; 426/5; 426/6
[58] Field of Search .................. 426/3, 4, 5, 6; 424/48

[56] References Cited

U.S. PATENT DOCUMENTS

| | | | |
|---|---|---|---|
| 2,224,252 | 12/1940 | Callaway | 426/590 |
| 3,632,358 | 1/1972 | Echeandia et al. | 426/3 |
| 3,657,424 | 4/1972 | Aktins et al. | 424/153 |
| 3,681,087 | 8/1972 | Johnson | 426/3 |

*Primary Examiner*—Natalie Trousof
*Assistant Examiner*—Robert C. Whittenbaugh
*Attorney, Agent, or Firm*—McCaleb, Lucas & Brugman

[57] ABSTRACT

Novel chewing gum composition for use by athletes and other persons to stimulate salivation while exercising, comprising the combination of at least three per cent by weight of an organic acid selected from the group consisting of adipic, ascorbic, citric, fumaric, lactic, malic and tartaric acids, and fructose. The organic acid and fructose combination provides a synergistic saliva stimulating effect greater than that of either ingredient alone. Sodium and potassium salts are included to help replenish those salts lost in perspiration, and high levels of dextrose or fructose provide a quick energy source and a hygroscopic agent for improved shelf life.

7 Claims, No Drawings

CHEWING GUM COMPOSITION

BACKGROUND OF THE INVENTION

1. Field of the Invention

This invention relates to chewing gum and, more particularly, to flavored chewing gum having a combination of ingredients enabling it to stimulate salivation synergistically beyond that attributable to the act of chewing food or either of the ingredients alone.

2. Description of the Prior Art

Chewing gum is used by athletes and other persons while exercising to relieve nervous tension. Chewing ordinary gum for a prolonged exercise period sometimes causes a dry mouth condition known as "cottonmouth". Exercising, of course, causes muscular fatigue along with loss of essential potassium and sodium salts through perspiration. Shelf life, that is, the ability to remain soft and readily chewable in storage, is also important.

Known gum compositions typically contain some form of chewable gum base, a softener, a flavoring ingredient and a sweetener, which can be either natural or artificial. While certain organic acids derived from natural products such as fruits, vegetables, plants and milk stimulate salivation, in order to be effective for this purpose, they have to be used in high concentrations (above 3% by weight), resulting in an objectionable strong and sour taste. One example of such an organic acid, which is an excellent salivating agent, is citric acid. Straight lemon juice, containing 5 to 8 percent citric acid, is too sour to use as is, and must be diluted substantially for use in foods and beverages. In the low concentrations normally found in foods and beverages, citric acid is not a very effective salivation agent.

Chewing gum is an ideal medium for the controlled release of salivation agents, quick energy sugars and sodium and potassium salts for athletes or other persons engaged in strenuous exercise. However, prior to the present invention, the only known gum composition developed to accomplish these results is disclosed in applicants' pending U.S. Patent Application Ser. No. 753,841, filed Dec. 23, 1976. This gum composition contains high levels of an organic acid and saccharin, the latter ingredient being considered by some to be harmful. Applicants are unaware of any other gum composition having a palatable taste yet containing a high concentration of an organic acid to achieve heavy saliva stimulation.

In Johnson U.S. Pat. No. 3,681,087, sticks of gum containing citric acid are dusted with miraculin powder, an odd substance which has the peculiar, taste-inverting characeristic of making sour things taste sweet. This is exactly the opposite of the effect which is needed in a saliva-stimulating gum composition, which should be quite tart for maximum salivation, yet not objectionably so.

Atkins and Attaway U.S. Pat. No. 3,657,424 discloses a commercial bottled citrus drink employing orange, grapefruit, lemon, lime or other acid fruit juices. Reference is made to use by athletes or other persons for replacing the loss of body fluids which results from exercising or working in high temperature environments. Calcium, sodium and potassium ions are included as supplements to make up for loss of these ions in perspiration. These citrus juices are very diluted and lack the concentration required for producing any salivation effect. Citrus juices, marketed in a can or bottle, cannot serve the same purpose as chewing gum. A professional athlete can chew gum while playing football, basketball or hockey to obtain extended slow-release benefits therefrom but obviously cannot carry a bottled beverage into play.

Further examples of the state of the art are shown in Ogawa and Terasawa U.S. Pat. No. 3,826,847 and Bilotti 3,352,689. Both relate to chewing gums. Neither discloses any salivation stimulating percentage (above 3% by weight) of any organic acid. The Ogawa et al patent has only a single example illustrating about 0.2 percent tartaric acid, which amount is insufficient for salivation. The Bilotti patent does not mention any organic acid ingredient at all. The gums disclosed in these patents are ineffective to act as stimulants of saliva to a degree greater than that attributable to the act of chewing food itself.

SUMMARY OF THE INVENTION

Accordingly, it is a principal object of the invention to provide a good tasting chewing gum composition having the ability, when used in the ordinary way, to stimulate salivation to a degree beyond that attributable to the mere act of chewing food and to eliminate the dry, so-called "cottonmouth" condition experienced with conventional chewing gum products; to reduce muscular fatigue by providing a quick source of energy; to replenish a portion of the body salts normally lost in perspiration; and to have improved shelf life.

These and other objects and advantages of the invention will be apparent from the following description, which discloses a preferred embodiment of the invention.

DESCRIPTION OF THE PREFERRED EMBODIMENT

The chewing gum composition of this invention is primarily intended for use by athletes and other persons during strenuous physical exercise. It is well-known that athletes engaged in competitive efforts chew gum to relieve tension; chewing, whether it be gum, tobacco, betel nut or a stick of wood, is a known means of relaxation. A chewing gum composition typically includes a gum base, flavoring additives, emulsifying agents, a sweetener and sometimes coloring ingredients, among others. Into such a gum composition, the present invention incorporates three additional features, namely, a saliva-stimulating and acid-masking combination of ingredients, a source of energy to reduce fatigue and a source of potassium and sodium salts to replenish those salts lost in perspiration during exercise.

In general, the present invention utilizes the heretofore unrecognized synergistic saliva-stimulating effect produced by the combination of a high level of fructose with high percentages (that is, above 3% by weight) of certain specified organic acids in a pleasant-tasting chewing gum. Actual tests have demonstrated that the resultant saliva-stimulating effect greatly exceeds that of either fructose or organic acid alone in gum compositions. The high level of fructose, which is a strong sweetener, partially masks the otherwise unacceptably sour taste caused by such high levels of organic acids. In addition, high levels of dextrose or fructose are preferably incorporated to provide both a quick energy source and a hygroscopic agent to improve shelf life. Furthermore, potassium or sodium salts, or both, are incorporated for slow, controlled release with the other ingredients.

It is well-known that the presence of a high level of certain organic acids specified herein, above about 3% of the total weight, makes a gum product unpleasantly sour. Similarly, a high level of fructose or other sweetener makes it too sweet. For these reasons, neither of these two ingredients is used separately at high levels in gum compositions. As previously stated, however, their combined use in the present invention, at the high levels stated, provides the excellent desired result, namely, effective saliva-stimulation in a pleasant-tasting chewing gum. It should be noted that while certain organic acids are known saliva stimulants, fructose alone is not thought to have that attribute and is not typically used for that purpose. The combination of these two ingredients increases saliva flow, reduces or eliminates "cottonmouth" inherent with prolonged chewing while exercising and results in a tart-flavored but pleasant-tasting chewing gum product.

Specifically, the organic acids, which, with fructose, will produce the desired salivation effect in the present invention, are one or more of those selected from the group consisting of adipic, ascorbic, citric, fumaric, lactic, malic and tartaric acids. These organic acids occur in natural products, although, as a practical matter, they may be synthesized for low-cost mass production. Adipic acid occurs in beet juice. Ascorbic acid is found in citrus fruits, hip berries, and fresh tea leaves. Citric acid is present in lemon, lime and grapefruit juices, to name a few sources. Fumaric acid is found in many plants. Lactic acid makes sour milk tart. Malic acid is found in unripe fruits, maple juice and apples. Finally, tartaric acid occurs in fruit and vegetable tissues.

The following examples will specifically list citric acid as the organic acid ingredient, but it will be understood that any one or combination of the other organic acids listed above may be substituted with the same beneficial results.

One example of the chewing gum composition of the present invention, employing the combination of high levels of organic acids and fructose, along with a high dextrose level, comprises the following ingredients on a weight basis: gum base, from 10 percent to 87 percent; dextrose syrup (conventional corn syrup), from 0 percent to 25 percent; granulated dextrose, from 0 percent to 80 percent; citric acid, from 3 percent to 10 percent; a softener such as glycerine, from 0 percent to 25 percent; fructose, from 10 percent to 70 percent; soluble food grade potassium salts, from 0 percent to 4 percent; a sodium salt, from 0 percent to 4 percent; and sucrose, a bulking component, from 0 percent to 80 percent. Additionally, conventional flavors (from 0.1 percent to 6 percent) and coloring ingredients can be added as desired. Within the specified ranges, the optimum levels of chewing gum ingredients are determined empirically, depending on the particular end product desired.

Another advantage of this invention, namely improved shelf life, results from the hygroscopic effect achieved by the combination of dextrose or fructose and the specified organic acids. In addition to supplying quick energy, the dextrose or fructose, when combined with these organic acids, can readily absorb and retain moisture from the air, allowing the final formulated gum product to hold moisture and stay fresh.

The preferred chewing gum composition of the present invention further includes a potassium salt or a sodium salt, or both, to replenish such salts lost in perspiration. Replenishment of these salts tends to reduce dehydration of muscle cells and retards fatigue. It will be understood that any of the following potassium and sodium salts can be utilized:

| | |
|---|---|
| potassium bi-sulfate | sodium acetate |
| potassium bi-tartrate | sodium bi-sulphate |
| potassium carbonate | sodium carbonate |
| potassium chloride | sodium citrate |
| potassium phosphate — (mono & di-basic) | sodium gluconate |
| | sodium phosphate |
| potassium pyro phosphate | sodium sulfate |
| potassium stearate | sodium tartrate |
| potassium sulfate | |
| potassium sulfite | |
| potassium tri poly phosphate | |

It should be noted that the presence of too high a level of either the potassium or sodium salts listed will adversely affect the taste of the gum product.

The preferred formula for the chewing gum composition of the present invention is as follows:

| Ingredient | Per Cent By Weight |
|---|---|
| Base | 25.00 |
| Dextrose Syrup | 10.00 |
| Dextrose (granulated) | 30.43 |
| Frutose | 20.00 |
| Citric Acid | 6.00 |
| Glycerine (softener) | 2.00 |
| Flavors | 1.25 |
| Potassium Salts | 0.27 |
| Sodium Salts | 0.05 |
| Sucrose | 5.00 |

If dextrose in syrup form is not utilized in formulating the gum composition, the addition of some form of plasticizer will be necessary to assist in the manufacture of such gum products and the percentage of granulated dextrose will have to be increased.

It will be understood that the foregoing detailed description is provided by way of illustration and that other gum compositions can readily be devised in accordance with the principles disclosed without departing from the spirit and scope of the invention.

The embodiments of the invention in which an exclusive property or privilege is claimed are defined as follows:

1. A chewing gum composition essentially comprising gum base; a sweetener; flavoring additives; a palatable and safe amount of an organic acid selected from the group consisting of adipic, ascorbic, citric, fumaric, lactic, malic and tartaric acids, said organic acid being capable of stimulating salivation beyond that attributable to the act of chewing food and constituting at least 3 percent by weight of the final gum composition; and fructose constituting at least 10 percent by weight of the final gum composition.

2. The chewing gum composition of claim 1 wherein said fructose constitutes from 10 percent to 70 percent by weight of the final gum composition.

3. The chewing gum composition of claim 1 wherein said sweetener is dextrose.

4. The chewing gum composition of claim 1 including potassium salts up to about 4 percent by weight of the final gum composition.

5. The chewing gum composition of claim 1 including sodium salts up to about 4 percent by weight of the final gum composition.

6. A chewing gum composition comprising on a weight basis: from about 10 percent to about 87 percent gum base; from about 0 percent to about 25 percent dextrose syrup; from about 0 percent to about 80 percent granulated dextrose; from about 0 percent to about 80 percent sucrose; from about 10 percent to about 70 percent fructose; from about 3 percent to about 10 percent of an organic acid selected from the group consisting of adipic, ascorbic, citric, fumaric, lactic, malic and tartaric acids; from about 0 percent to about 4 percent potassium salts; from about 0 percent to about 4 percent sodium salts; and effective amounts of flavoring and softening agents.

7. A chewing gum composition comprising the following on a weight percent basis:

| | |
|---|---|
| gum base | 25.00 per cent |
| dextrose syrup | 10.00 per cent |
| granulated dextrose | 30.43 per cent |
| fructose | 20.00 per cent |
| citric acid | 6.00 per cent |
| glycerine | 2.00 per cent |
| flavors | 1.25 per cent |
| sodium salt | 0.05 per cent |
| potassium salt | 0.27 per cent |
| sucrose | 5.00 per cent |

* * * * *